United States Patent
Obilisetty (10) Patent No.: US 7,164,752 B1
(45) Date of Patent: Jan. 16, 2007

(54) METHOD AND SYSTEM PROVIDING CONTROL OPTIONS FOR VOICE FILES

(75) Inventor: Sridhar Obilisetty, Milpitas, CA (US)

(73) Assignee: Vianeta Corporation, Milipitas, CA (US)

( * ) Notice: Subject to any disclaimer, the term of this patent is extended or adjusted under 35 U.S.C. 154(b) by 347 days.

(21) Appl. No.: 09/751,711

(22) Filed: Dec. 28, 2000

(51) Int. Cl.
  *H04M 1/64* (2006.01)
(52) U.S. Cl. ...................... 379/68; 379/88.17
(58) Field of Classification Search .............. 379/67.1, 379/68, 74, 78, 80, 85, 88.13, 88.16, 88.17, 379/88.22, 90.01, 93.01
  See application file for complete search history.

(56) References Cited

U.S. PATENT DOCUMENTS 5,440,624 A * 8/1995 Schoof, II .............. 379/202.01
6,122,239 A * 9/2000 Bodo et al. .............. 369/32.01
2002/0006124 A1 * 1/2002 Jimenez et al. .............. 370/352

\* cited by examiner

*Primary Examiner*—Ovidio Escalante
(74) *Attorney, Agent, or Firm*—Townsend and Townsend and Crew LLP (57) ABSTRACT

A method and system thereof for recording information in an Internet-based architecture; specifically, a method and system for implementing rewind and fast forward commands with digital voice files while a recording session is in progress. Audio content is recorded and digitized. As the recording session progresses, the recorded audio content is partitioned into a plurality of temporally sequenced voice files. Each of the voice files stores a contiguous segment of the audio content. A user input is received identifying a function for controlling the recording (e.g., rewind or fast forward). In response, a particular one of the voice files is accessed.

24 Claims, 9 Drawing Sheets

METHOD AND SYSTEM PROVIDING CONTROL OPTIONS FOR VOICE FILES

TECHNICAL FIELD

The present invention relates to the recording of dictated information. In particular, the present invention pertains to control options for recording into voice files.

BACKGROUND ART

When a doctor (generally speaking, a health professional) provides medical services for a patient, the doctor is required to document his/her observations and other relevant information. In some cases, the doctor writes down his/her notes in the patient's file, or perhaps a report is typed by either the doctor or a member of the doctor's staff. However, because of busy schedules and heavy patient loads, most doctors opt instead to dictate (record) an oral report that is subsequently transcribed into a written (typed) report.

Figure 1:
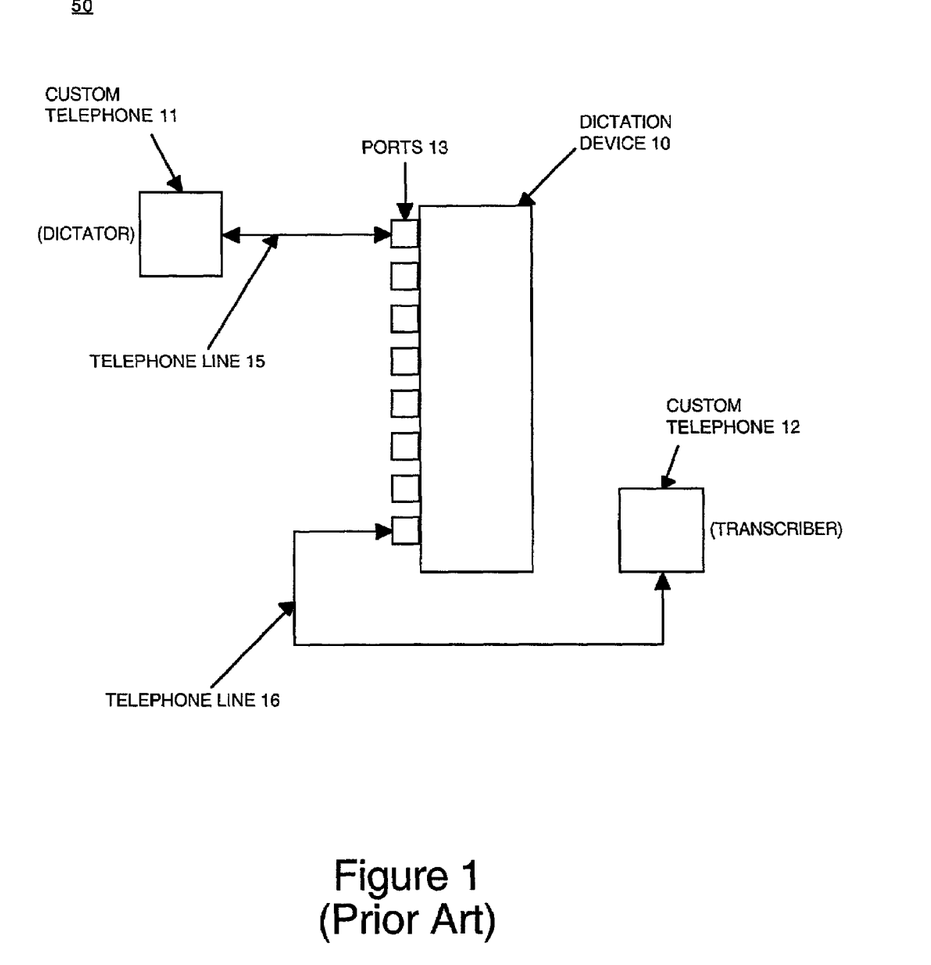
FIG. 1 is a block diagram of an exemplary prior art system for transcribing information such as medical records.

Prior Art FIG. 1 is a block diagram illustrating a typical system 50 used for medical transcription. Central to system 50 is a dictation device 10 which is used for recording dictated information. Dictation device 10 has a number of ports 13 for receiving incoming calls. The person dictating information places a call over telephone line 15 into one of the ports 13 of dictation device 10. Similarly, the person who will transcribe the recorded information places a call over telephone line 16 into another one of the ports 13 of dictation device 10. Thus, ports 13 are utilized by those users (dictators) wishing to record information as well as those users (transcribers) who will transcribe the recorded information.

Typically, the dictator and the transcriber use custom telephones 11 and 12 when accessing dictation device 10. The telephones 11 and 12 generally incorporate special features and functions that facilitate communication with dictation device 10. Other special equipment appurtenant to telephones 11 and 12, such as foot pedals, may also be required for recording or transcribing information to and from dictation device 10. Therefore, one disadvantage to the prior art is that users generally need to purchase extra, and perhaps costly, equipment in order to properly communicate with dictation device 10.

In addition, prior art systems exemplified by system 50 are expensive to equip, operate and maintain. Because devices such as dictation device 10 have a limited number of ports 13, multiple devices are often needed in order to accommodate the number of dictators and transcribers that need to use them. Dictation devices are expensive, and therefore the cost of purchasing a sufficient number of such machines can be very high. As the number of users increases, more dictation devices are needed, further increasing capital expenditures.

Furthermore, the cost of maintaining dictation devices can also be very high. While in the simplest sense dictation device 10 functions similar to a tape recorder, in reality dictation devices are relatively complex machines having a number of components for facilitating the dictation process, and for enabling the retrieval of dictated information by transcribers. Even reliable machines require routine maintenance, and with the complexity of dictation devices, maintenance costs may be unacceptably high, especially when repairs are needed. Accordingly, it is desirable to reduce the costs associated with dictation devices and appurtenant equipment.

Furthermore, in the prior art, upgrading or updating the dictation devices is difficult and inconvenient. With the need to have multiple dictation devices, if there is a need for an update or upgrade, each device must be individually modified. An inordinate amount of time, with commensurate costs, is spent repeating the modification for each dictation device 10 in use.

However, users are familiar with the capabilities and functional interfaces of current devices and dictation systems. For example, users can start a dictation, rewind a portion of it before finishing the dictation, listen to the rewound portion, record over that portion, move back or forth to another point, and resume recording at that point. Therefore, it is also desirable that a solution to the aforementioned problems of the prior art provides, to a large extent, the same capability and functionality of familiar devices and systems. It is also desirable that a solution to the problems of the prior art maintains, to some extent, a familiar user interface.

DISCLOSURE OF THE INVENTION

The present invention provides a method and system that can reduce the costs associated with dictation devices and appurtenant equipment while providing the capability and functionality afforded by more conventional recording devices. These and other objects and advantages of the present invention will become obvious to those of ordinary skill in the art after having read the following detailed description of the preferred embodiments which are illustrated in the various drawing figures.

The present embodiment of the present invention pertains to a method and system thereof for recording dictated information. In particular, the present embodiment pertains to a method and system that provide recording options that can be used with digital voice files while a recording session is in progress. Specifically, in accordance with the present invention, rewind and fast forward commands can be implemented with digital voice files while the recording session is in progress.

In the present embodiment, audio content is recorded and digitized. A first portion of the audio content is recorded over a first interval of time, and this first portion is stored in a first voice file. A second portion of the audio content contiguous with the first portion is recorded over a second interval of time following the first interval, and this second portion is stored in a second voice file. This process continues for the length of the recording session. Thus, in accordance with the present invention, the recorded audio content is partitioned into a plurality of temporally sequenced voice files while the recording session is in progress, with each of the voice files storing a contiguous segment of the audio content.

In the present embodiment, using a conventional telephone providing Dual Tone Multiple Frequency (DTMF) input, a user selects a function for controlling the recording (e.g., rewind, fast forward, or the like) using the keypad of the telephone. In response to the user's input, a particular one of the voice files is accessed. For example, if the rewind function is selected, one of the earlier voice files is accessed. In one embodiment, a particular point in the particular voice file is accessed.

By pressing buttons on the keypad of the telephone, the user can play (listen to) the recorded information provided by the accessed voice file, modify that information, and the like. The user can also rewind or fast forward to another voice file. Thus, in accordance with the present invention, the same capability and functionality of familiar devices and systems, as well as a familiar user interface, is provided.

In a preferred embodiment, the information pertains to medical records, such as the records generated by health professionals with regard to patient visits. However, the present invention is well-suited for other types of uses, such as transcription of courtroom records. The present invention can also be implemented with voice mail systems.

In the preferred embodiment, the present invention is well-suited to the recording of dictated information using the Internet. In that embodiment, the recording process is initiated with a telephone connection to, for example, an intelligent communication server (ICS) operated by a Common (or Competitive) Local Exchange Carrier (CLEC). Using the Internet, a server computer system on the World Wide Web (WWW) is notified by the ICS of the telephone connection. The server provides instructions to the ICS for conducting the recording session; for example, the instructions can identify user preferences, and set up protocols and prompts based on those preferences. The dictated information is recorded and digitized in a voice file that is sent to the server via the Internet. Accordingly, a larger number of users (including users who are recording as well as users who are transcribing) can be accommodated; because a conventional dictation service is not used, there will not be a limitation imposed by the number of available ports. Furthermore, the system can be readily expanded to accommodate additional users.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "sending," "providing," "recording," "digitizing," "accessing," "controlling," "storing" or "implementing" or the like, refer to actions and processes (e.g., processes 500, 600, 700 and 800 of FIGS. 5A, 5B, 6, 7 and 8, respectively) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 2:
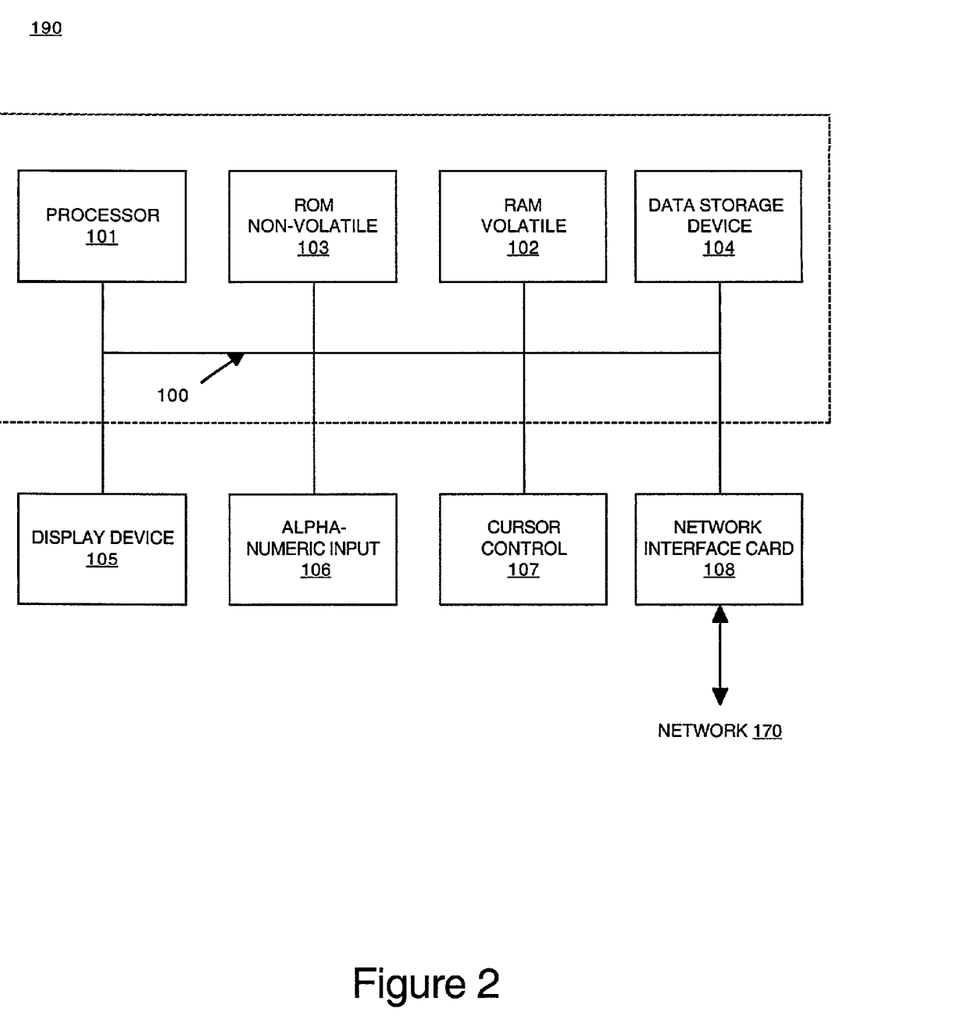
FIG. 2 is a block diagram of an exemplary computer system upon which embodiments of the present invention may be practiced.

Refer now to FIG. 2 which illustrates an exemplary computer system 190 upon which embodiments of the present invention may be practiced. Computer system 190 may be utilized as a server computer system on the World Wide Web (WWW). In general, computer system 190 of FIG. 2 comprises bus 100 for communicating information, processor 101 coupled with bus 100 for processing information and instructions, random access (volatile) memory 102 coupled with bus 100 for storing information and instructions for processor 101, read-only (non-volatile) memory 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 to a network 170 (e.g., the Internet).

With reference still to FIG. 2, optional display device 105 utilized with computer system 190 may be a liquid crystal device, cathode ray tube, or other display device suitable for creating graphic images and alphanumeric characters recognizable to the user. Optional cursor control device 107 allows the computer user to dynamically signal the two-dimensional movement of a visible symbol (pointer) on a display screen of display device 105. Many implementations of the cursor control device are known in the art including a trackball, mouse, joystick or special keys on optional alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

The present invention is discussed primarily in the context of a system and method implemented via the Internet and used for recording and transcribing information, such as medical information or courtroom records. However, it is appreciated that the present invention may also find uses in other Internet-based applications such as, but not limited to, voice mail systems.

System and Method for Recording and Transcribing Information

Figure 3:
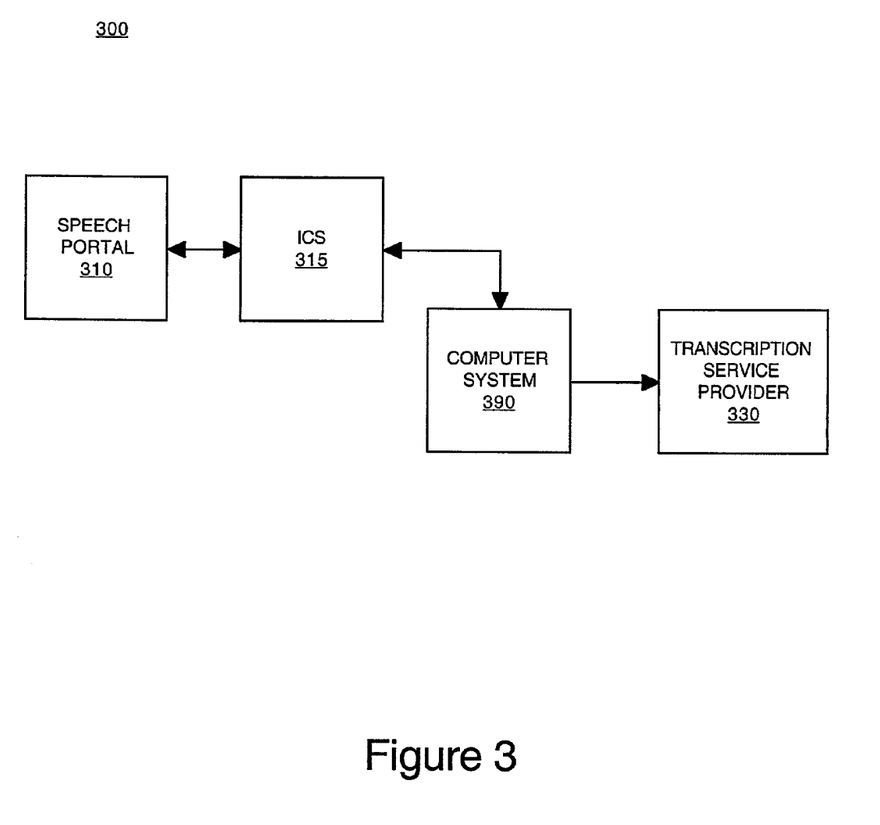
FIG. 3 is a block diagram illustrating an exemplary system architecture for capturing and transcribing information in accordance with one embodiment of the present invention.

FIG. 3 is a block diagram illustrating an exemplary system architecture 300 for capturing and transcribing information in accordance with one embodiment of the present invention. In one embodiment, speech portal 310 (e.g., a telephone) is communicatively coupled to an intelligent communication server (ICS) 315 operated by, for example, a Common (or Competitive) Local Exchange Carrier (CLEC). In turn, ICS 315 can be communicatively coupled to computer system 390 (e.g., a Web server), and computer system 390 can be communicatively coupled to transcription service provider 330.

It is appreciated that the present invention is well-suited for use with any number of speech portals, intelligent communication servers operated by different CLECs, computer systems, Web servers, and transcription service providers. It is further appreciated that, in addition to computer system 390, other servers such as a database server and a file server can be utilized. Thus, the present invention can be readily scaled up in size.

Various known mechanisms can be used for coupling each of the devices in system architecture 300. For example, some or all of the devices can be communicatively coupled using any network protocol that supports a network connection, such as Internet Protocol, TCP (Transmission Control Protocol), and HyperText Transfer Protocol (HTTP). Some or all of the devices can alternatively be coupled using a serial bus (e.g., RS232 or IEEE 1394), a parallel bus, a Universal Serial Bus (USB), or any other type of workable connection. It is also appreciated that wireless connections can also be used to communicatively couple the devices.

In the preferred embodiment, ICS 315 is communicatively coupled to computer system 390, and computer system 390 to transcription service provider 330, via the Internet or WWW. In this embodiment, communication between ICS 315 and computer system 390 uses Voice Extensible Markup Language (VXML); however, the use of other types of markup languages is contemplated.

In one embodiment, speech portal 310 may be a conventional telephone or other such device. That is, in accordance with the present invention, custom equipment having special features and functions is not needed. Additional information is provided in conjunction with FIGS. 7 and 8, below.

ICS 315 is exemplified by computer system 190 of FIG. 2. In the present embodiment, ICS 315 functions to provide access to a public switched telephone network (PSTN) and to route incoming calls to their proper destinations. ICS 315 also functions to receive and digitize information into voice files, and to forward the voice files to computer system 390 via the Internet. In one embodiment, ICS 315 includes a POP (Point of Presence) server. By using the Internet to forward the voice files, the number of ports available for receiving telephone connections is substantially increased relative to the prior art. Accordingly, a larger number of users can be recording information at any one time.

In one embodiment, computer system 390 is a server on the WWW. As such, computer system 390 is exemplified by computer system 190 of FIG. 2.

With reference still to FIG. 3, in one embodiment, transcription service provider 330 is a computer system or other such device (e.g., a word processor) that can be coupled to the Internet, receive and play voice files, and send voice files and transcript files (that is, a file containing the transcribed version of a voice file). As such, transcription service provider is also exemplified by computer system 190 of FIG. 2.

With reference to FIG. 3, in accordance with the present embodiment of the present invention, a user accesses ICS 315 via speech portal 310 (e.g., using a telephone). In one embodiment, ICS 315 recognizes that the incoming call is for transcription services based on the telephone number used to access ICS 315. However, it is appreciated that other mechanisms may be used to identify that the incoming call is for transcription services; for example, the user may identify the need for such services in response to a prompt.

In the present embodiment, ICS 315 notifies computer system 390 of the incoming call. In accordance with the present invention, ICS 315 contacts computer system 390 via the Internet by executing the Uniform Resource Locator (URL) for computer system 390. In one embodiment, computer system 390 sends, via the Internet, a set of instructions to ICS 315 for implementing a user interface. In another embodiment, the instructions are cached by ICS 315 after they are received from computer system 390, so that the instructions do not have to be sent each time they are needed. It is appreciated that the instructions can be updated as needed using a variety of techniques; for example, the updates can occur automatically at a prescribed time or time interval, under the direction of either ICS 315 or computer system 390.

In the present embodiment, ICS 315 executes the user interface prescribed by the instructions from computer system 390. The user interface includes an audio message providing greetings, prompts, menus and options to guide the user through the dictation process. In one embodiment, the user interface allows the caller (user) to identify the subject and the type of work that describe the information to be transcribed, so that the recorded voice file can be forwarded to the appropriate transcriber (e.g., a transcriber having expertise in that subject or type of work). The user interface also allows the caller to identify the priority for having the recorded information transcribed (e.g., urgent or not). In the present embodiment of the present invention, the user interface allows the caller to execute rewind and fast forward commands (as well as other commands such as rewind to the beginning of the recording, and fast forward to the end of the recording) to control and facilitate the recording process while the recording session is in progress.

As used herein, "recording session" includes the period between the time in which a user starts recording a particular message and the time at which the user completes the recording of that message. Thus, as used herein, the recording session encompasses more than just the time that the user is actually recording, and can include the time in which the user is moving (e.g., rewinding or fast forwarding) through the recorded message, playing back portions of the message, and the like.

Once the user has been identified, the user interface can be customized according to predefined user preferences. For example, additional instructions defining a custom user interface can be provided to ICS 315 by computer system 390 via the Internet. Also, the functionality of the different buttons on the keypad of the telephone being used by the caller (e.g., speech portal 310) can be set depending on the caller. That is, one caller may prefer one button for the rewind function, while another caller may prefer a different button.

In the present embodiment, recorded information is digitized (e.g., analog-to-digital conversion) by ICS 315. In accordance with the present invention, while the recording session is in progress, the recorded information for the recording session is partitioned into a plurality of temporally sequence voice files. Each of the voice files stores a contiguous segment of the recorded information. Additional information is provided in conjunction with FIG. 7, below.

Continuing with reference to FIG. 3, in one embodiment, the resultant voice files for the recording session are forwarded to computer system 390 via the Internet. In response to, for example, a rewind or fast forward command from the user, one of the voice files is retrieved and sent back to ICS 315, so that the user can listen to or change the contents of that file. Additional information is provided in conjunction with FIG. 7.

At computer system 390, in the present embodiment, after the recording session is completed, the voice files for the recording session are integrated into a single voice file and added to a queue. Computer system 390 functions to keep track of each voice file and its location. Computer system 390 also functions to keep track of the proper order of each file and its contents so that the voices files are properly combined.

In the present embodiment, computer system 390 sends the integrated voice file for the recording session to transcription service provider 330, either automatically or in response to a request from transcription service provider 330. Because the voice file for the recording session is forwarded by computer system 390 to transcription service provider 330 via the Internet, there are no limitations associated with the number of ports available to transcribers. As a result, a much larger number of transcribers can be receiving voice files at any one time.

As an electronic file, the voice file for the recording session can be quickly and conveniently routed to the appropriate transcription service provider 330, and then to an individual transcriber. In one embodiment, the voice file is compressed so they can be transferred more quickly. In one embodiment, the voice file is automatically downloaded to transcription service provider 330.

Figure 4:
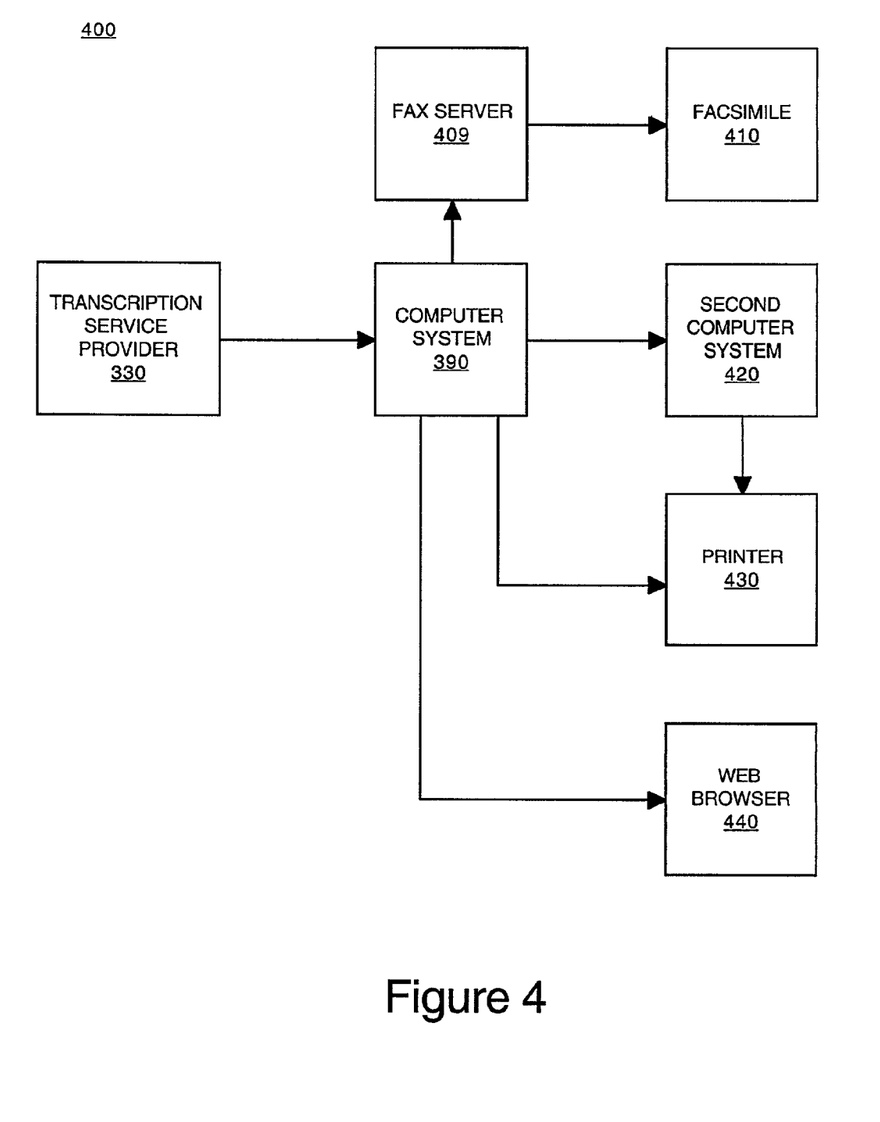
FIG. 4 is a block diagram illustrating an exemplary system architecture for distributing transcribed information in accordance with one embodiment of the present invention.

FIG. 4 is a block diagram illustrating one embodiment of an exemplary system architecture 400 for distributing transcribed information in accordance with the present invention. In the present embodiment, transcription service provider 330 is communicatively coupled to computer system 390, which can be communicatively coupled to facsimile (fax) 410, a second computer system 420, a printer 430, a Web browser 440, and/or other like devices that have the function and capability for printing and/or displaying transcribed information. In one embodiment, second computer system 420 may be a text server coupled to printer 430. The devices in system architecture 400 can be communicatively coupled using the various mechanisms described above in conjunction with FIG. 3. In a preferred embodiment, the devices in system architecture 400 are communicatively coupled via the Internet or WWW.

Referring still to FIG. 4, transcription service provider 330 returns to computer system 390 a transcript file providing a transcribed version of the voice file for the recording session. In one embodiment, the transcript files are automatically uploaded to computer system 390 via the Internet. In various embodiments, the transcript files can be formatted according to conventional word processing applications (such as Microsoft Word), XML (Extensible Markup Language), or HL7.

The transcribed information can be provided by computer system 390 to the end user in a variety of different ways. In one embodiment, the transcribed information can be sent to facsimile (fax) 410 via fax server 409 and printed. In another embodiment, the transcribed information can be sent to a text server (e.g., second computer system 420) or a printer 430 for printing. In yet another embodiment, the transcribed information can be displayed on a computer system (e.g., second computer system 420) or on a Web browser 440 by opening the transcript file. In addition, in one embodiment, the transcript file can be integrated into an end user information system (for example, for medical records, the transcribed information can be integrated into a Hospital Information System).

In one embodiment, the transcript file can be viewed by accessing a Web site on computer system 390 and displaying the transcribed information on a remote computer system such as second computer system 420. In addition, the transcript file can be viewed on a portable device such as a palmtop or handheld computer system, a Web pad, a mobile phone with display capability, a pager with display capability, as well as other types of devices having a display capability. Furthermore, the Web site on computer system 390 can also provide information regarding the status of each of the various voice files in process.

In addition, voice files can be sent to a device (e.g., second computer system 420 or Web browser 440) that has the capability to make the voice files audible to a user. As such, the user can listen to voice files while reviewing (e.g., proofreading) a printed or displayed version of the transcribed information.

The present invention thus provides a centrally manageable and accessible system (e.g., system architectures 300 and 400) for capturing, transcribing, and delivering information. Accordingly, the transcription system of the present invention can be accessed from virtually any location.

Figure 5A:
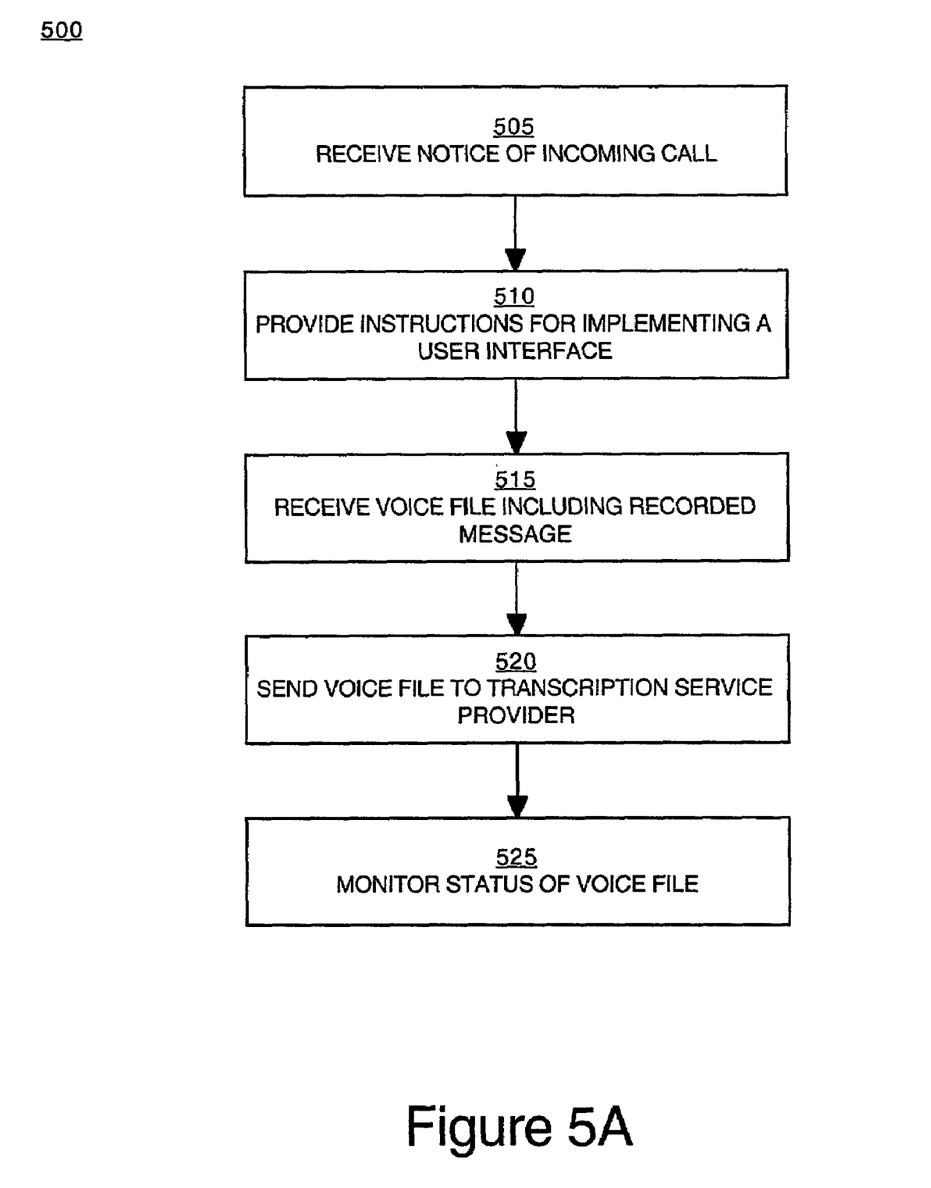
FIG. 5A is a flowchart of the steps in a process for capturing and transcribing information in accordance with one embodiment of the present invention.

FIG. 5A is a flowchart of the steps in a process 500 for capturing and transcribing information in accordance with one embodiment of the present invention. In accordance with the present invention, process 500 can be implemented via computer-readable program instructions stored in a memory unit (e.g., random access memory 102, read-only memory 103, and/or data storage device 104) and executed by processor 101 of computer system 190 (FIG. 2) in a network of devices (e.g., system architecture 300 of FIG. 3, respectively). In a preferred embodiment, process 500 is implemented on computer system 390 of FIG. 3.

In one embodiment, in step 505 of FIG. 5A and with reference also to FIG. 3, computer system 390 receives notice from ICS 315 of an incoming call requesting transcription services. In the present embodiment, computer system 390 receives this notification via the Internet.

In step 510, in the present embodiment, computer system 390 provides instructions to ICS 315 (specifically, to a POP server resident on ICS 315). In one embodiment, the instructions are provided responsive to step 505. In another embodiment, the instructions are provided beforehand and cached by ICS 315. The instructions from computer system 390 are for implementing a user interface between ICS 315 and the caller. The instructions are first used to provide a greeting and to request information identifying the caller, for example. Once the caller is identified, subsequent instructions are used to customize the user interface according to predefined user preferences. Additional information is provided in conjunction with FIG. 5B.

In step 515, in the present embodiment, the voice files for the recording session are received at computer system 390 from ICS 315 via the Internet. In the present embodiment, computer system 390 integrates the voice files for the recording session into a single voice file. Additional information is provided in conjunction with FIGS. 7 and 8, below.

In step 520, in the present embodiment, when the recording session is completed, the integrated voice file for the recording session is sent over the Internet to transcription service provider 330 for transcribing. The voice file can be automatically forwarded via the Internet to transcription service provider 330, or provided in response to a request from transcription service provider 330.

In step 525, in one embodiment, the status of the voice file can be monitored. Because the voice files all pass through computer system 390, the time at which they arrive, the time that they are forwarded to transcription service provider 330, and the time that they are returned (as transcript files) can be noted. As such, a user can access computer system 390 (specifically, a Web site residing on computer system 390 and identified by a URL) to determine the status of the information (voice file) the user has recorded. In addition, the voice files for each completed recording session can be stored on computer system 390 for a specified period of time, so that users can access and listen to their files (using applicable security safeguards).

Figure 5B:
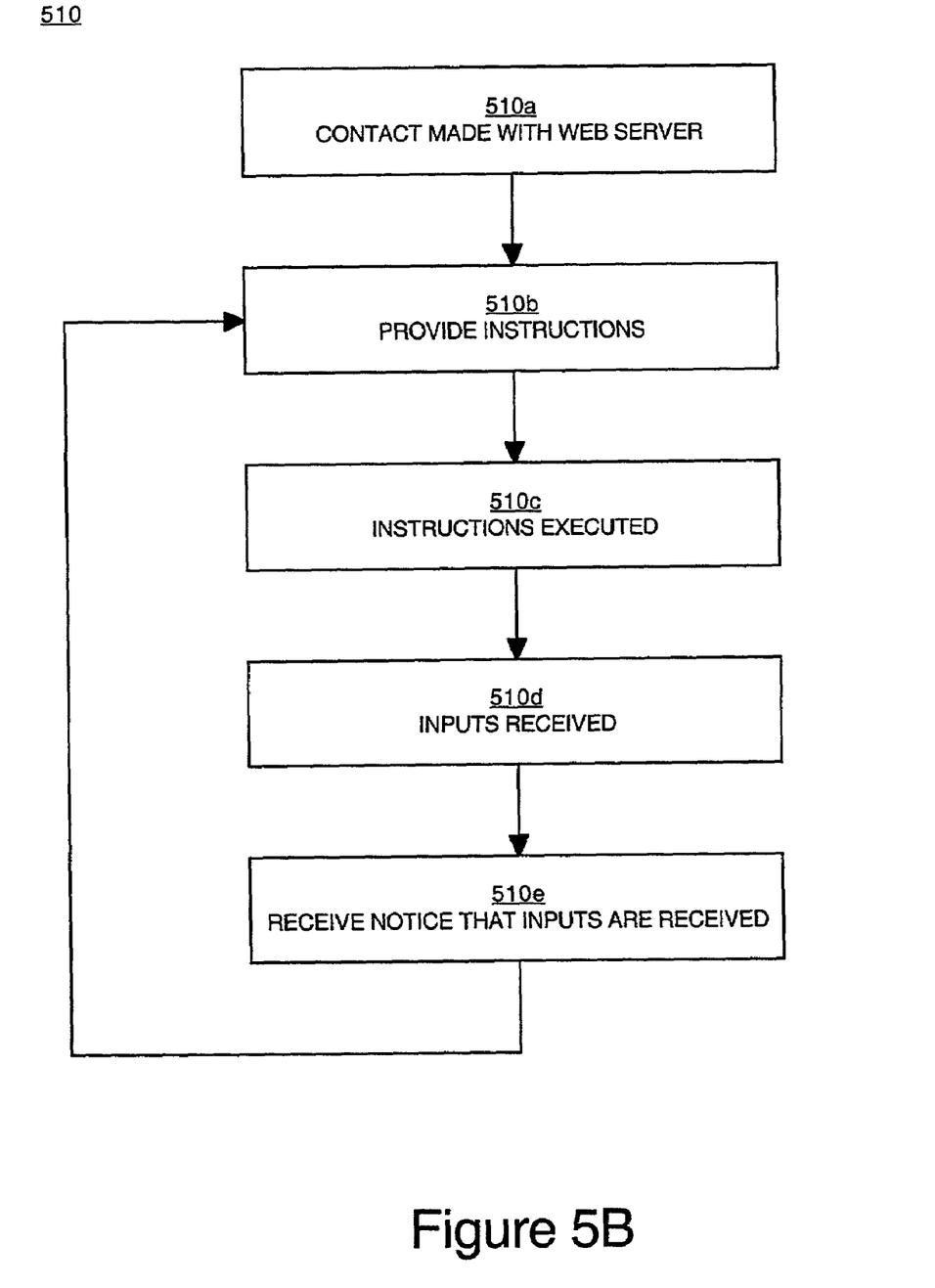
FIG. 5B is a flowchart of the steps in a process for providing instructions to implement a user interface in accordance with one embodiment of the present invention.

FIG. 5B is flowchart providing additional information with regard to step 510 of FIG. 5A. In step 510a of FIG. 5B, a caller (e.g., a dictator) contacts the Web server (e.g., computer system 390) via ICS 315 (FIG. 3) as described above.

In step 510b of FIG. 5B, computer system 390 provides a set of instructions to the caller (specifically, to a POP server residing on ICS 315). The first set of instructions that are provided pertain to a greeting and a request for information (e.g., a password) used for identifying the caller. Subsequent sets of instructions are used to customize the user interface according to user preferences, to facilitate the recording, and the like. For example, depending on the user's preferences, one of the buttons on the keypad of the user's telephone can be used for the rewind function, and another button for the fast forward function. Different buttons can be used for different users.

In step 510c, the instructions received from computer system 390 are executed by the POP server (ICS 315). In step 510d, inputs responsive to the executed instructions are received from the caller. In step 510e, notice is provided by the POP server (ICS 315) to computer system 390 that the expected inputs have been received. Accordingly, the next set of instructions are sent from computer system 390 to ICS 315 (specifically, to the POP server). If there are no further instructions required, the process ends.

In general, according to step 510, sets of instructions are sent by computer system 390 to ICS 315, and executed by the POP server resident on ICS 315. A set of inputs in response to the instructions is expected, and when the expected inputs are received, notice is provided by ICS 315 to computer system 390. Accordingly, the next set of instructions can be sent and executed, until all pertinent instructions have been executed and the associated inputs received.

In accordance with the present invention, instructions can be readily changed on computer system 390. The instructions can be changed prior to a connection with computer system 390, or they can be changed in response to user input.

Figure 6:
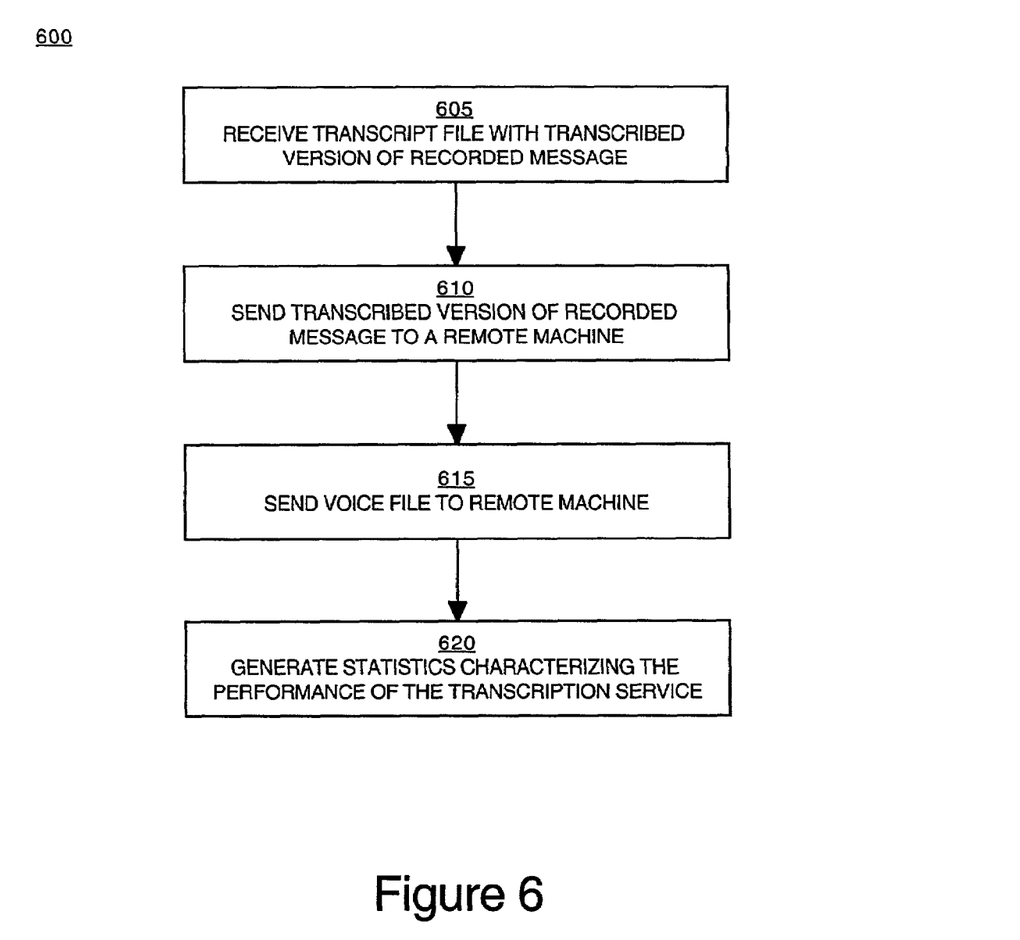
FIG. 6 is a flowchart of the steps in a process for distributing transcribed information in accordance with the present invention.

FIG. 6 is a flowchart of the steps in a process 600 for distributing transcribed information in accordance with the present invention. In accordance with the present invention, process 600 can be implemented via computer-readable program instructions stored in a memory unit (e.g., random access memory 102, read-only memory 103, and/or data storage device 104) and executed by processor 101 of computer system 190 (FIG. 2) in a network of devices (e.g., system architecture 400 of FIG. 4). In a preferred embodiment, process 600 is implemented on computer system 390 of FIG. 4.

In step 605 of FIG. 6, with reference also to FIG. 4, in the present embodiment, computer system 390 receives via the Internet a transcript file from transcription service provider 330. In one embodiment, the transcript files are automatically uploaded to computer system 390 via the Internet. Consequently, a user can access computer system 390 (specifically, a Web site residing on computer system 390 and identified by a URL) to view the transcript file. As described previously, the voice file associated with the transcript file can also be accessed on computer system 390, so that the voice file can be listened to while the transcript file is displayed.

In step 610, the transcript file can be can be provided to the end user by computer system 390 in a variety of different ways. In one embodiment, the transcribed information can be sent to facsimile 410 and printed thereon. In another embodiment, the transcribed information can be sent to a text server (e.g., second computer system 420) or a printer 430 for printing. In yet another embodiment, the transcribed information can be sent to a computer system (e.g., second computer system 420 or Web browser 440) for display or for integration into an information system.

In step 615, in one embodiment, the voice file for a recording session is also be sent via the Internet by computer system 390 to a device that has the capability to make the voice file audible (e.g., second computer system 420 or Web browser 440).

In step 620, in one embodiment, statistics are generated to characterize the performance of the transcription service. As described above in conjunction with FIG. 5A (step 525), voice files and transcript files can be time-stamped as they pass through computer system 390. Thus, the amount of time needed to transcribe voice files can be tracked, and alerts and notifications can be generated in case the time for completing a transcription approaches the expected delivery time. In addition, it is possible to track whether or not a recording session has been transcribed, reducing the possibility that a recording session may be overlooked. Furthermore, the amount of recorded information (e.g., the size of the various voice files) not yet transcribed can be readily determined, so that workloads can be more conveniently managed.

System and Method Providing Control Options for Recording Voice Files

Figure 7:
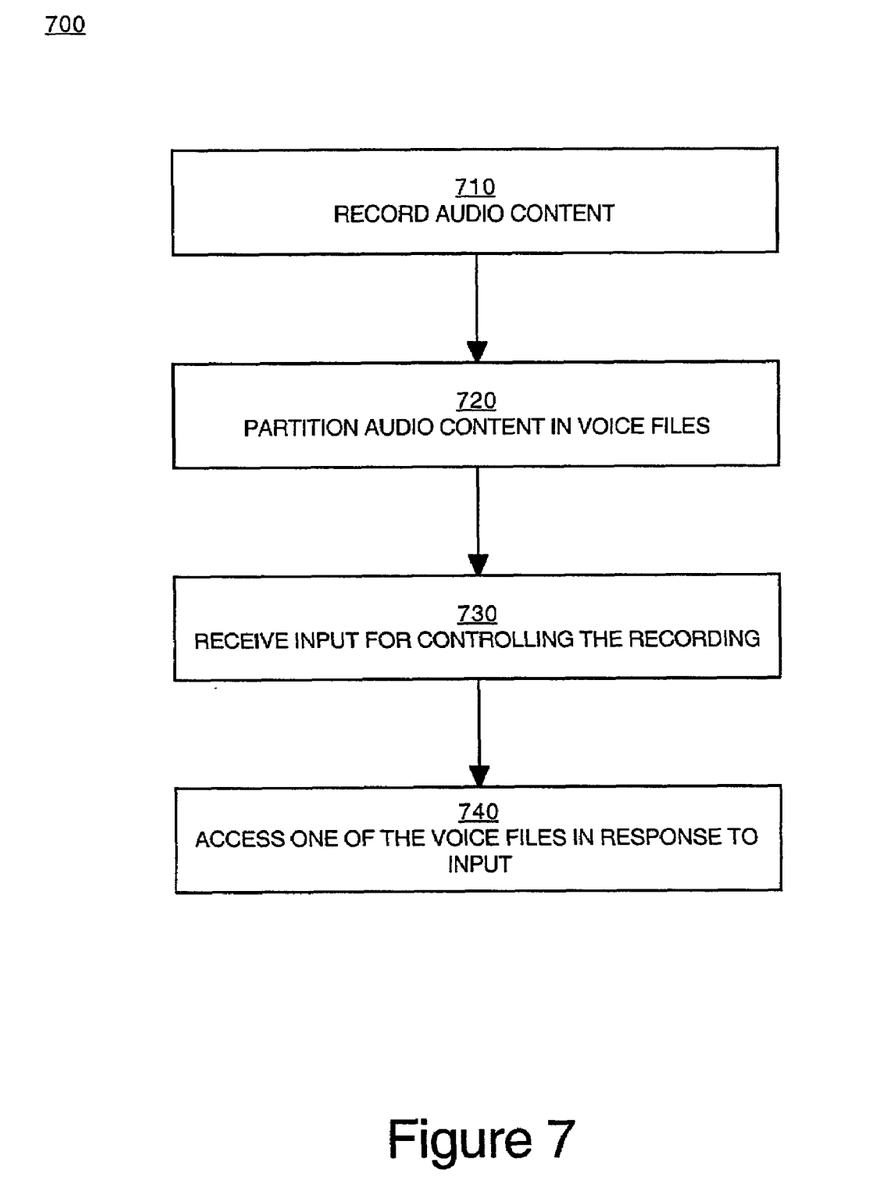
FIG. 7 is a flowchart of the steps in a process for recording information in accordance with one embodiment of the present invention.

FIG. 7 is a flowchart of the steps in a process 700 for recording information in accordance with one embodiment of the present invention. In accordance with the present invention, process 700 can be implemented via computer-readable program instructions stored in a memory unit (e.g., random access memory 102, read-only memory 103, and/or data storage device 104) and executed by processor 101 of computer system 190 (FIG. 2) in a network of devices (e.g., system architecture 300 of FIG. 3, respectively). In a preferred embodiment, process 700 is primarily implemented on ICS 315 of FIG. 3 (specifically, on a POP server resident on ICS 315), with aspects of process 700 implemented on computer system 390 of FIG. 3.

In step 710 of FIG. 7, with reference also to FIG. 3, audio content is received by ICS 315 from speech portal 310. In the present embodiment, the user dictates information to be recorded into a conventional telephone which is in communication with ICS 315.

In step 720, the incoming audio content is digitized by ICS 315 and partitioned into a plurality of temporally sequenced voice files. Specifically, each voice file includes a contiguous segment of the audio content being recorded.

In one embodiment, a first portion of the audio content is recorded over a first interval of time, and this first portion is stored in a first voice file. A second portion of the audio content contiguous with the first portion is recorded over a second interval of time following the first interval, and this second portion is stored in a second voice file. This process continues for the length of the recording session. Thus, in accordance with the present embodiment of the present invention, the recorded audio content is partitioned into a plurality of temporally sequenced voice files while the recording session is in progress, with each of the voice files storing a contiguous segment of the audio content.

Thus, in the present embodiment of the present invention, a plurality of contiguous and temporal voice files are used to store a single recorded message. As will be seen, by partitioning the audio content into discrete voice files, a user can readily move within the recorded message using, for example, rewind and fast forward commands in accordance with the present invention.

In one embodiment, the audio content is recorded for a specified interval of time. In one embodiment, the specified interval of time is ten (10) seconds. Thus, in this embodiment, each voice file comprises audio content 10 seconds in length. It is also understood that, should the recording be completed before the specified time interval is completed, the last voice file will be associated with a shorter time interval. For example, should the audio content be 36 seconds in length, for a time interval of 10 seconds, three voice files encompassing 10 seconds of audio content each and one voice file encompassing six (6) seconds of audio content would be created.

In another embodiment, instead of a constant time interval for each voice file, the voice file encompasses audio content for varying time intervals. In this embodiment, the length of the voice file corresponds to the amount of time that the user dictates (records) without interruption; that is, the amount of time that the user dictates before entering a pause, rewind or fast forward command, for example (refer to step 730, below). The POP server (ICS 315) informs computer system 390 of the length of the voice file and of the command that was input by the user. When the user resumes recording, a new voice file is created for the next set of information being recorded, until the user next interrupts the recording. Thus, a first voice file is created for the audio content recorded from the beginning of the recording session until a first interruption. A second voice file is created for the audio content received when recording resumes until the next interruption, and so on. Should the user want to re-record a portion of the first voice file, for example, computer system 390 is notified of the point in the file where the new information begins. Accordingly, computer system 390 will only use that portion of the first voice file up to that point, and another voice file will begin with the new recording. This process continues until the recording session is completed.

Thus, in one embodiment, recording continues into a first voice file until a maximum time limit is reached (e.g., a specified time interval of 10 seconds), at which point the recording is continued into a second voice file, and so on. In another embodiment, recording continues into a first voice file until interrupted by the user (e.g., the user presses a button on the keypad of the telephone in order to rewind, for example), a second voice file is used when the recording is continued, and so on. Computer system 390 is informed of the lengths of the voice files, the points in the files where recording is ended and where re-recording begins, and other such information, so that computer system 390 can track the recording session and integrate the resultant voices files into an integrated voice file in the proper order.

In the present embodiment, ICS 315 sends each voice file to computer system 390 as each file is completed. However, it is appreciated that voice files can instead be sent to computer system 390 in groups of multiple files, perhaps at fixed intervals, or that the voice files can be sent to computer system 390 when the recording session is completed.

In step 730 of FIG. 7, user input specifying a particular function for controlling the recording session is received by ICS 315 and sent to computer system 390. As described above in conjunction with FIG. 5B, when a particular set of instructions is being executed by the POP server of ICS 315, computer system 390 is looking for a particular set of inputs corresponding to those instructions. Thus, in the present embodiment, computer system 390 has provided to the POP server (ICS 315) a set of instructions (e.g., an algorithm) for implementing a set of control functions such as rewind and fast forward. When the POP server (ICS 315) receives the input expected for a control function, it notifies computer system 390 of the input. Computer system 390 then sends an appropriate instruction to the POP server to implement the control function (e.g., rewind or fast forward). For example, for the rewind or fast forward function, computer system 390 sends an instruction to the POP server to play a particular voice file. Computer system 390 can also calculate the point in the voice file (e.g., a line number, bit address, or the like) where the POP server should begin playing the recording.

In the present embodiment, Dual Tone Multiple Frequency (DTMF) input is received by the POP server (ICS 315). Thus, in accordance with the present invention, the user enters his/her input using the touch-tone keypad on a conventional telephone system (e.g., speech portal 310 of FIG. 3). For example, the user can press the "R" button (e.g., the number 7) on a conventional telephone keypad to implement a rewind command. Similarly, the user can press the "F" button (the number 3) on a conventional telephone keypad to implement a fast forward command. It is appreciated that different buttons can be used to implement these functions depending on the user's preferences, as described above in conjunction with FIG. 5B. In accordance with the present invention, this input can be received while the recording session is in progress.

In the present embodiment, the number of times that the user presses a button on the telephone keypad determines how far backward or forward to travel within the recorded audio content. Accordingly, the number of times that user presses the button on the telephone keypad also determines which voice file is needed, and to what point in the file the user is transferred.

In one embodiment, rewind and fast forward tags, as well as tags for similar functions such as rewind to the beginning of the recording, rewind/fast forward to the beginning of a voice file, and the like, are added to VXML.

In step 740 of FIG. 7, in the present embodiment, ICS 315 (e.g., the POP server) notifies computer system 390 of the DTMF input (from step 730). Responsive to the type of command from the user (e.g., rewind or fast forward), computer system 390 returns to ICS 315 the particular voice file needed. For the rewind function, computer system 390 notifies the POP server (ICS 315) to play the audio content from an earlier file in the temporal sequence of voice files. For the fast forward function, computer system 390 instructs the POP server to play the audio content from a later file in the temporal sequence of voice files. Computer system 390 can also instruct the POP server where in the file to begin playing the audio content (e.g., at a point in the file identified by a known address mechanism such as a line number).

For example, for a case in which the rewind function is defined to rewind 10 seconds of audio content, when a user presses the "R" button once, then the voice file containing the portion of the recording that is 10 seconds back will be retrieved and sent from computer system 390 to ICS 315, along with instructions to play that file. Should the user press the "R" button twice, the voice file containing the audio content that was received 20 seconds ago is sent to ICS 315, along with instructions to play that file.

In one embodiment, in response to a rewind or fast forward command, the user is transferred to a location in another (earlier or later) voice file that corresponds to the current position in the current voice file. For example, if the recording has progressed 6 seconds into the current voice file, and the preceding voice file is accessed in response to a rewind command, then the user is transferred to a location 6 seconds into the preceding voice file. It is appreciated that the user may alternatively be transferred to another point within a voice file in response to a rewind or fast forward command, including the beginning of the voice file.

Similarly, the user can rewind or fast forward to a position in the voice file currently in use. For example, for the case in which the rewind function is defined to rewind 10 seconds of audio content, when a user presses the "R" button once, then computer system 390 will calculate the location in the current voice file that precedes the current position by 10 seconds, and the user will be transferred to that location.

Figure 8:
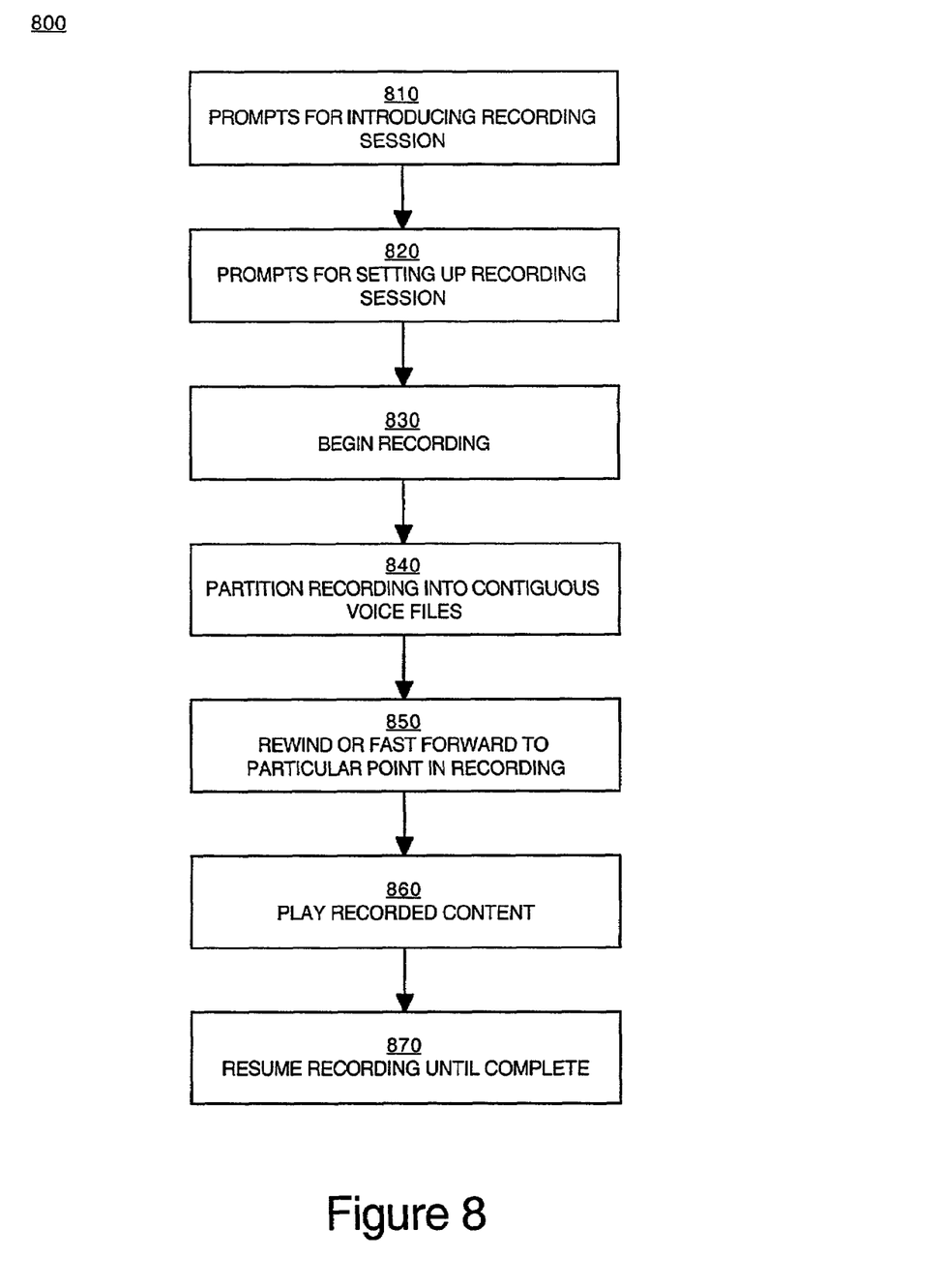
FIG. 8 is a flowchart of the steps in an exemplary recording session in accordance with one embodiment of the present invention.

FIG. 8 is a flowchart of the steps in a process 800 exemplifying a recording session in accordance with one embodiment of the present invention. In the present embodiment, the user has previously established an account containing stored information such as a user ID, preferences, and the like. At the beginning of the recording session, after the user has been identified, the user's preferences can be retrieved.

In step 810, a user receives prompts for introducing the recording session, such as a greeting and the like. In accordance with the present invention, computer system 390 provides instructions to ICS 315 as described in conjunction with FIGS. 5A and 5B.

In step 820 of FIG. 8, the user receives prompts for setting up the recording session. For example, the user can also specify the type of information to be recorded, the priority of the information, and the like. As in the above, computer system 390 provides instructions to ICS 315 as described in conjunction with FIGS. 5A and 5B.

In step 830 of FIG. 8, the user begins recording. In step 840, as described in conjunction with FIG. 7, the audio content received from the user is partitioned into a temporal sequence of contiguous voice files.

In step 850 of FIG. 8, while the recording session is still in progress, the user can move within the recorded audio content by entering commands using the touch-tone keypad of a conventional telephone. The commands are implemented as described in conjunction with FIGS. 5B and 7.

In step 860, in response to the user input of step 850, the appropriate voice file is retrieved and the audio content played back for the user. In step 870, the user can continue recording. The user can record over existing content, or add information to the recording.

In summary, in accordance with the present invention, expensive dictation equipment (e.g., custom telephones and dictation devices) can be eliminated. Instead, a user can use a conventional telephone to dictate and record information into a voice file. In accordance with the present invention, the same capability and functionality of familiar devices and systems, as well as a familiar user interface, is provided.

In addition, unlike prior art recording systems, the present invention system and method are readily updated and upgraded. Because instructions are sent from computer system 390 to ICS 315 (FIG. 3), the instructions can be modified as needed, either prior to a recording session or while the recording session is in progress (e.g., in response to a user input).

The present invention provides a method and system that can reduce the costs associated with dictation devices and appurtenant equipment without a reduction in the flexibility and functionality afforded by more conventional recording devices. Furthermore, the present invention facilitates the implementation of a system architecture for recording and transcribing information over the Internet, such as the system architecture described by FIGS. 3 and 4. That is, the present invention enables an Internet-based system architecture to be implemented with the flexibility and functionality users are familiar with.

The preferred embodiment of the present invention, method and system providing control options for voice files, is thus described. While the present invention has been described in particular embodiments, it should be appreci-

What is claimed is:

1. A method for recording information comprising:
recording audio content;
partitioning said audio content into a plurality of temporally sequenced voice files, wherein each of said voice files stores a contiguous segment of said audio content;
receiving an input specifying a function for controlling said recording, said input receivable and said function executable while a recording session is in progress, wherein said input is for one of a rewind command and a fast forward command and wherein said function is implemented as a VXML (Voice Extensible Markup Language) tag; and
accessing a particular one of said voice files in response to said input and according to said function, said accessing performed with said recording session still in progress.

2. The method as recited in claim 1 comprising:
accessing a particular point in said particular one of said plurality of voice files in response to said input.

3. The method as recited in claim 1 wherein said recording comprises:
digitizing said audio content.

4. The method as recited in claim 1 wherein said partitioning comprises:
recording a first portion of said audio content over a first interval of time;
storing said first portion in a first voice file;
recording a second portion of said audio content contiguous to said first portion over a second interval of time following said first interval of time; and
storing said second portion in a second voice file.

5. The method as recited in claim 4 wherein said first interval of time and said second interval of time are substantially equal.

6. The method as recited in claim 1 wherein said accessing comprises:
in response to a rewind command, accessing an earlier voice file in said plurality of temporally sequenced voice files in response to said rewind command.

7. The method as recited in claim 1 wherein said accessing comprises:
in response to a fast forward command, accessing a later voice file in said plurality of temporally sequenced voice files in response to said fast forward command.

8. The method as recited in claim 1 comprising:
receiving instructions for implementing said function from a server computer system via the Internet.

9. A computer system comprising:
a bus;
a memory unit coupled to said bus; and
a processor coupled to said bus, said processor for executing a method for recording information comprising:
recording audio content;
partitioning said audio content into a plurality of temporally sequenced voice files, wherein each of said voice files stores a contiguous segment of said audio content;
receiving an input specifying a function for controlling said recording, said input receivable and said function executable while a recording session is in progress, wherein said input is for one of a rewind command and a fast forward command and wherein said function is implemented as a VXML (Voice Extensible Markup Language) tag; and
accessing a particular one of said voice files in response to said input and according to said function, said accessing performed with said recording session still in progress.

10. The computer system of claim 9 wherein said method comprises:
accessing a particular point in said particular one of said plurality of voice files in response to said input.

11. The computer system of claim 9 wherein said recording of said method comprises:
digitizing said audio content.

12. The computer system of claim 9 wherein said partitioning of said method comprises:
recording a first portion of said audio content over a first interval of time;
storing said first portion in a first voice file;
recording a second portion of said audio content contiguous to said first portion over a second interval of time following said first interval of time; and
storing said second portion in a second voice file.

13. The computer system of claim 12 wherein said first interval of time and said second interval of time are substantially equal.

14. The computer system of claim 9 wherein said accessing of said method comprises:
in response to a rewind command, accessing an earlier voice file in said plurality of temporally sequenced voice files in response to said rewind command.

15. The computer system of claim 9 wherein said accessing of said method comprises:
in response to a fast forward command, accessing a later voice file in said plurality of temporally sequenced voice files in response to said fast forward command.

16. The computer system of claim 9 wherein said method comprises:
receiving instructions for implementing said function from a server computer system coupled to said computer system via the Internet.

17. A computer-usable medium having computer-readable program code embodied therein for causing a computer system to perform a method comprising:
recording audio content;
partitioning said audio content into a plurality of temporally sequenced voice files, wherein each of said voice files stores a contiguous segment of said audio content;
receiving an input specifying a function for controlling said recording, said input receivable and said function executable while a recording session is in progress, wherein said input is for one of a rewind command and a fast forward command and wherein said function is implemented as a VXML (Voice Extensible Markup Language) tag; and
accessing a particular one of said voice files in response to said input and according to said function, said accessing performed with said recording session still in progress.

18. The computer-usable medium of claim 17 wherein said computer-readable program code embodied therein causes a computer system to perform said method comprising:
accessing a particular point in said particular one of said plurality of voice files in response to said input.

19. The computer-usable medium of claim 17 wherein said computer-readable program code embodied therein causes a computer system to perform said method comprising:
digitizing said audio content.

20. The computer-usable medium of claim 17 wherein said computer-readable program code embodied therein causes a computer system to perform said method comprising:
- recording a first portion of said audio content over a first interval of time;
- storing said first portion in a first voice file;
- recording a second portion of said audio content contiguous to said first portion over a second interval of time following said first interval of time; and
- storing said second portion in a second voice file.

21. The computer-usable medium of claim 20 wherein said first interval of time and said second interval of time are substantially equal.

22. The computer-usable medium of claim 17 wherein said computer-readable program code embodied therein causes a computer system to perform said method comprising:
- in response to a rewind command, accessing an earlier voice file in said plurality of temporally sequenced voice files in response to said rewind command.

23. The computer-usable medium of claim 17 wherein said computer-readable program code embodied therein causes a computer system to perform said method comprising:
- in response to a fast forward command, accessing a later voice file in said plurality of temporally sequenced voice files in response to said fast forward command.

24. The computer-usable medium of claim 17 wherein said computer-readable program code embodied therein causes a computer system to perform said method comprising:
- receiving instructions for implementing said function from a server computer system coupled to said computer system via the Internet.

* * * * *

UNITED STATES PATENT AND TRADEMARK OFFICE
CERTIFICATE OF CORRECTION

| | | |
|---|---|---|
| PATENT NO. | : 7,164,752 B1 | Page 1 of 1 |
| APPLICATION NO. | : 09/751711 | |
| DATED | : January 16, 2007 | |
| INVENTOR(S) | : Obilisetty | |

It is certified that error appears in the above-identified patent and that said Letters Patent is hereby corrected as shown below:

On the Title Page, in Item (73), under "Assignee", in Column 1, Line 1, delete "Corporation, Milipitas," and insert -- Communication, Milpitas, --, therefor.

Signed and Sealed this
Twenty-sixth Day of April, 2016

Michelle K. Lee
*Director of the United States Patent and Trademark Office*